(12) United States Patent
Yu et al.

(10) Patent No.: US 9,933,256 B2
(45) Date of Patent: Apr. 3, 2018

(54) INSPECTION PROGRAM EDITING ENVIRONMENT INCLUDING REAL-TIME FEEDBACK RELATED TO THROUGHPUT

(71) Applicants: Mitutoyo Corporation, Kanagawa-ken (JP); Mitutoyo Europe GmbH, Neuss (DE)

(72) Inventors: Dahai Yu, Redmond, WA (US); Thomas Moch, Gaeufelden-Oeschelbronn (DE); Bart De Vlieghere, Lubbeek (BE)

(73) Assignees: Mitutoyo Corporation, Kanagawa-ken (JP); Mitutoyo Europe GmbH, Neuss (DE)

( * ) Notice: Subject to any disclaimer, the term of this patent is extended or adjusted under 35 U.S.C. 154(b) by 356 days.

(21) Appl. No.: 14/682,976

(22) Filed: Apr. 9, 2015

(65) Prior Publication Data
US 2016/0298958 A1    Oct. 13, 2016

(51) Int. Cl.
*G01B 21/04* (2006.01)
*G05B 19/4097* (2006.01)
*G06F 17/50* (2006.01)

(52) U.S. Cl.
CPC ......... *G01B 21/04* (2013.01); *G05B 19/4097* (2013.01)

(58) Field of Classification Search
CPC ...... G01B 21/04; G01B 21/047; G01B 21/06; G01B 21/20; G05B 19/4097;
(Continued)

(56) References Cited

U.S. PATENT DOCUMENTS 4,901,253 A    2/1990    Iwano et al.
4,908,951 A    3/1990    Gurny
(Continued)

FOREIGN PATENT DOCUMENTS

EP    1330 686 A2    7/2003
WO    2002/23292 A2    3/2002

OTHER PUBLICATIONS

Ng et al., Autonomous Coordinate Measurement Planning with Work-In-Progress Measurement for TRUE-CNC, 1998, CIRP Annals—Manufacturing Technology, vol. 47, Issue 1, pp. 455-458.*
YouTube, "CMM Inspection Programming Automation—PAS CMM for Solid Works," Uploaded on Jun. 2, 2010, retrieved from http://www.youtube.com/watch?v=rAbDGXNGryc, DVD.
(Continued)

*Primary Examiner* — Toan Le
(74) *Attorney, Agent, or Firm* — Seed IP Law Group LLP

(57) ABSTRACT

A system is provided for programming workpiece feature inspection operations for a coordinate measuring machine (CMM). The system includes a computer-aided design (CAD) file processing portion and a user interface which includes an editing user interface portion and an execution time indicator. The CAD file processing portion analyzes an input CAD file to automatically determine workpiece features. The editing user interface portion includes an editable plan representation including an editable set of the workpiece features to be inspected. The execution time indicator is indicative of an estimated inspection program execution time for operating the CMM to execute a corresponding workpiece inspection program. The execution time indicator is automatically updated in response to a utilization of one of a first set of operations to modify the current workpiece feature inspection plan, so as to automatically indicate the estimated effect of the modification on the inspection program execution time.

20 Claims, 12 Drawing Sheets

(58) Field of Classification Search
CPC ........ G05B 19/40931; G05B 19/40935; G05B 19/40937; G05B 19/4099; G06F 17/50
See application file for complete search history.

(56) References Cited

U.S. PATENT DOCUMENTS

| | | | |
|---|---|---|---|
| 5,465,221 | A | 11/1995 | Merat et al. |
| 5,471,406 | A | 11/1995 | Breyer et al. |
| 7,058,472 | B2 | 6/2006 | Mathews et al. |
| 7,146,291 | B2 | 12/2006 | Hough |
| 7,652,275 | B2 | 1/2010 | Gladnick |
| 7,783,445 | B2 | 8/2010 | McLean et al. |
| 8,028,085 | B2 | 9/2011 | Elien et al. |
| 8,302,031 | B1 | 10/2012 | Sang |
| 8,438,746 | B2 | 5/2013 | Usui |
| 8,957,960 | B2 | 2/2015 | Saylor et al. |
| 9,013,574 | B2 | 4/2015 | Saylor et al. |
| 9,646,425 | B2 | 5/2017 | Yu et al. |
| 2005/0281453 | A1 | 12/2005 | Boyer |
| 2009/0136114 | A1 | 5/2009 | Wu et al. |
| 2011/0054685 | A1 | 3/2011 | Wada |
| 2011/0218776 | A1 | 9/2011 | Shono et al. |
| 2013/0120553 | A1 | 5/2013 | Delaney et al. |
| 2013/0120567 | A1 | 5/2013 | Northrup et al. |
| 2013/0125044 | A1 | 5/2013 | Saylor et al. |
| 2014/0185910 | A1 | 7/2014 | Bryll et al. |
| 2015/0139381 | A1 | 5/2015 | O'Hare et al. |
| 2015/0205283 | A1 | 7/2015 | Brand et al. |
| 2015/0277436 | A1 | 10/2015 | Kalmar-Nagy et al. |
| 2015/0300798 | A1 | 10/2015 | Pettersson et al. |
| 2016/0284079 | A1 | 9/2016 | Persely |
| 2016/0327383 | A1 | 11/2016 | Becker et al. |
| 2017/0193652 | A1 | 7/2017 | Persely |

OTHER PUBLICATIONS

YouTube, "CMM Off line Programming in CATIA V5," Published on Oct. 22, 2013, retrieved from https://www.youtube.com/watch?v=qWecGeK4xtA, DVD.

YouTube, "CMM Programming—How to create inspection-ready programs in NX (Siemens PLM)," Published Nov. 8, 2012, retrieved from https://www.youtube.com/watch?v=h8wHfkPdTI0, DVD.

YouTube, "Metrology Spotlight: Introducing PC-DMIS 2014 (TV511)," Published Jun. 3, 2014, retrieved from https://www.youtube.com/watch?v=QPCGbTEpyW8, DVD.

YouTube, "PAS CMM Inspection Automation Software—Introduction," Uploaded Jun. 1, 2010, retrieved from http://www.youtube.com/watch?v=0D8iLm_eJ1E, DVD.

YouTube, "Pcdmis AutoPath," Uploaded Sep. 14, 2009, retrieved from https://www.youtube.com/watch?v=ag04aUvo49A, DVD.

YouTube, "Renishaw PH20 Collision Avoidance by VDMIS CMM Software," Published Jan. 31, 2014, retrieved from http://www.youtube.com/watch?v=OjMZH44n5fY, DVD.

YouTube, "VDMIS CMM Software and CMM Retrofit Solutions," Published on Jan. 3, 2014, retrieved from http://www.youtube.com/watch?v=Rj0tWs553yo, DVD.

PC-DMIS Product Brochure, Hexagon Metrology, 2013, 24 pages.

PC-DMIS CMM Manual, Wilcox Associates, Inc., last updated: Feb. 26, 2015, 255 pages.

Berkelaar et al., Wilcox Associates, Inc., "PC-DMIS 4.3 Reference Manual Window XP and Vista Version," May 1, 2004, Version 5.1.0.0.

Mitutoyo America Corporation, "Automatic Measurement Program Generation Software," Bulletin No. 2150, MiCAT Planner, 0614-05, Aurora IL, Aug. 2014, 2 pages.

Mitutoyo America Corporation, "CMM Software Suite," Bulletin No. 1701, MiCAT , 10B-4, Aurora IL, Oct. 2003, 16 pages.

\* cited by examiner

INSPECTION PROGRAM EDITING ENVIRONMENT INCLUDING REAL-TIME FEEDBACK RELATED TO THROUGHPUT

BACKGROUND

Technical Field

This disclosure relates to precision metrology, and more particularly to editing inspection programs for coordinate measuring machines.

Description of the Related Art

Certain metrology systems including coordinate measurement machines (CMMs) can be utilized to obtain measurements of inspected workpieces and may be controlled at least in part by workpiece feature inspection operations that have been programmed on a computer. One exemplary prior art CMM is described in U.S. Pat. No. 8,438,746, which is hereby incorporated by reference in its entirety. As described in the '746 patent, the CMM includes a probe for measuring a workpiece, a movement mechanism for moving the probe, and a controller for controlling the movement mechanism.

A CMM which includes a surface scanning probe is described in U.S. Pat. No. 7,652,275 (the '275 patent), which is hereby incorporated herein by reference in its entirety. After a scan, a three-dimensional profile of the workpiece is provided. The workpiece may be measured by a mechanical contact probe scanning along the workpiece surface, or by an optical probe which scans a workpiece without physical contact. Optical probes may be of a type that may use points of light for detecting surface points (such as triangulation probes), or a type that uses a video camera, wherein the coordinates of geometric elements of the workpiece are determined via image processing software. A "combined" CMM that uses both optical and mechanical measuring is described in U.S. Pat. No. 4,908,951, which is hereby incorporated herein by reference in its entirety.

In all of the above described CMMs, operations may be programmed for inspecting workpiece features. Such programmed operations may generally be edited by adding, removing or otherwise altering particular program elements operations that are associated with particular workpiece features. However, in existing CMM programming systems, such editing operations are not always easy for a user to perform or to understand with respect to the various effects such edits may have relative to altering the efficiency or effectiveness for the inspection of a particular workpiece feature or for the overall inspection plan. A need exists for a system and/or user interface features which allow such understanding in an immediate and intuitive manner during inspection program creation and/or editing for a CMM.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A system is provided for programming workpiece feature inspection operations for a CMM. In various implementations, the CMM includes at least one sensor, a stage, and a CMM control portion, wherein the sensor is used for determining workpiece feature measurement data and the stage is used for holding a workpiece, and at least one of the sensor or the stage is movable relative to one another. In various implementations, the system for programming the workpiece feature inspection operations includes a computer-aided design (CAD) file processing portion and a user interface, which includes an editing user interface portion and an execution time indicator.

In various implementations, the computer-aided design (CAD) file processing portion inputs a workpiece CAD file corresponding to a workpiece and analyzes the file to automatically determine workpiece features on the workpiece corresponding to a plurality of geometric feature types. The editing user interface portion includes an editable plan representation of a workpiece feature inspection plan for the workpiece corresponding to the CAD file, wherein the editable plan representation includes an editable set of workpiece features to be inspected. The execution time indicator is indicative of an estimated inspection program execution time for operating the CMM to execute a workpiece inspection program corresponding to the current workpiece feature inspection plan as executed by a current CMM configuration. A first set of operations is usable to edit the workpiece feature inspection plan, and the system is configured such that the execution time indicator is automatically updated in response to a utilization of one of the first set of operations to modify the current workpiece feature inspection plan, so as to automatically indicate the estimated effect of the modification on the inspection program execution time.

DETAILED DESCRIPTION

Figure 1:
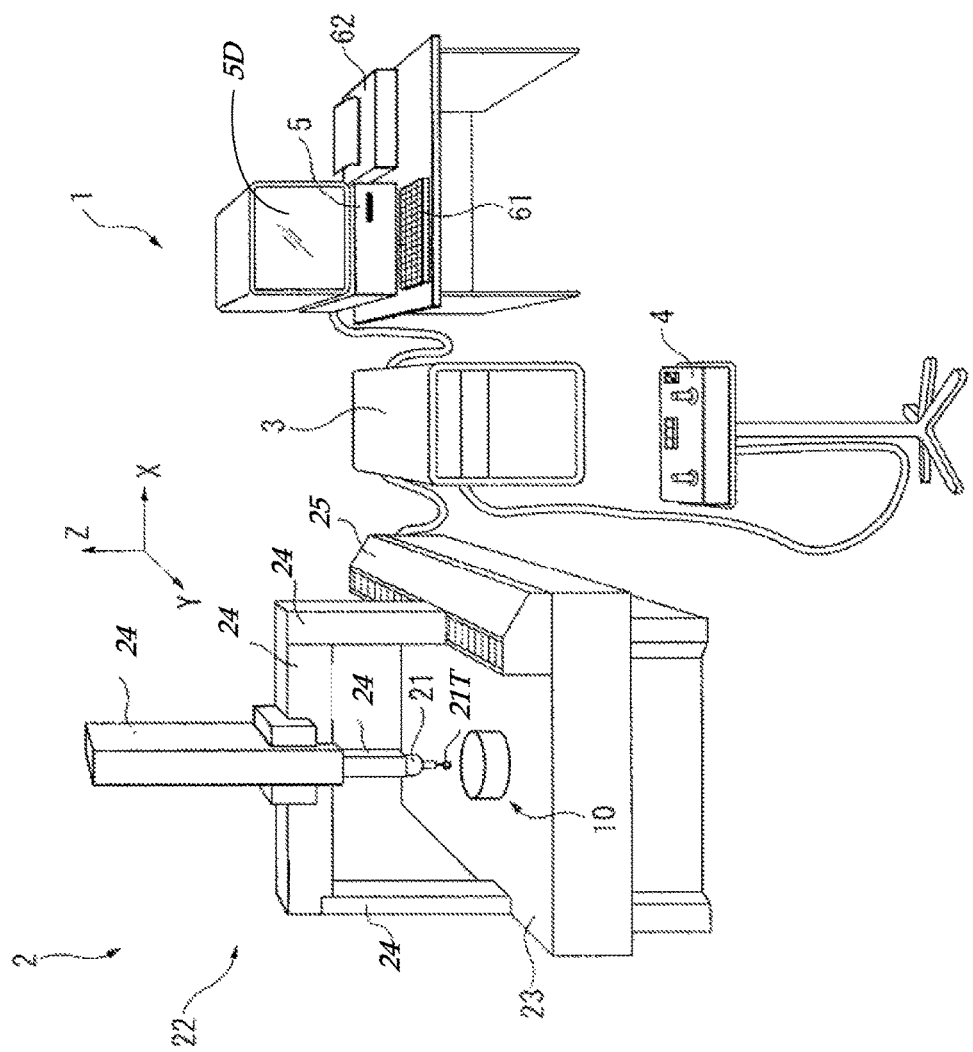
FIG. 1 is a diagram showing various typical components of a metrology system comprising a CMM.

FIG. 1 is a diagram showing various typical components of a metrology system 1 including a generic CMM, which provides one context for application of the principles disclosed herein. Certain aspects of the metrology system 1 are further described in the '746 patent. The metrology system 1 may include: a CMM body 2; a motion controller 3 that controls a drive of the coordinate measuring machine body 2; an operating unit 4 for manually operating the coordinate measuring machine body 2; a host computer 5 that issues commands to the motion controller 3 and executes processing such as for the inspection of features on a workpiece 10 (an object to be measured) disposed on the CMM body 2. A representative input unit 61 and output unit 62 are connected to the host computer 5, as well as a display unit 5D. The display unit 5D may display a user interface, for example as described further below with respect to FIGS. 3-10.

The CMM body 2 may include: a probe 21 having a stylus 21T which may contact a surface of the workpiece 10; a movement mechanism 22 that includes a three-axis slide mechanism 24 that holds the base end of the probe 21; a measurement stage 23 that holds the workpiece 10 and on which a drive mechanism 25 moves the slide mechanism 24. In various implementations, the drive mechanism 25 may be controlled by a CMM control portion (e.g., including the motion controller 3). As will be described in more detail below, in various implementations one or more sensors of the CMM (e.g., including the probe 21 and/or stylus 21T) may be moved relative to the measurement stage 23 (e.g., as controlled by the motion controller 3) and utilized for determining workpiece feature measurement data (e.g., with regard to physical dimensions of features of the workpiece 10).

Figure 2A:
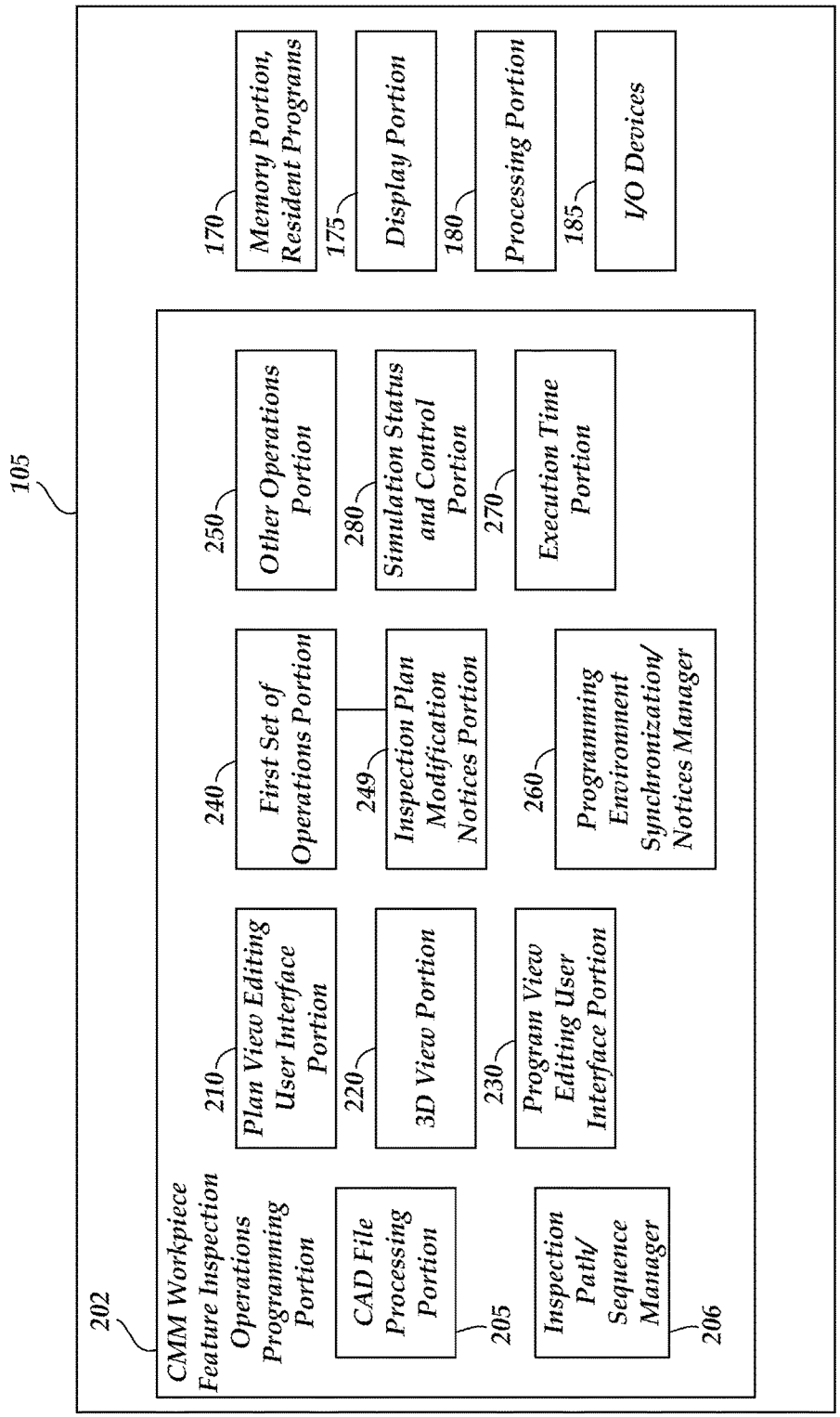
FIGS. 2A and 2B are diagrams showing various elements of one embodiment of a computing system on which workpiece feature inspection operations may be programmed for the CMM of FIG. 1.
Figure 2B:
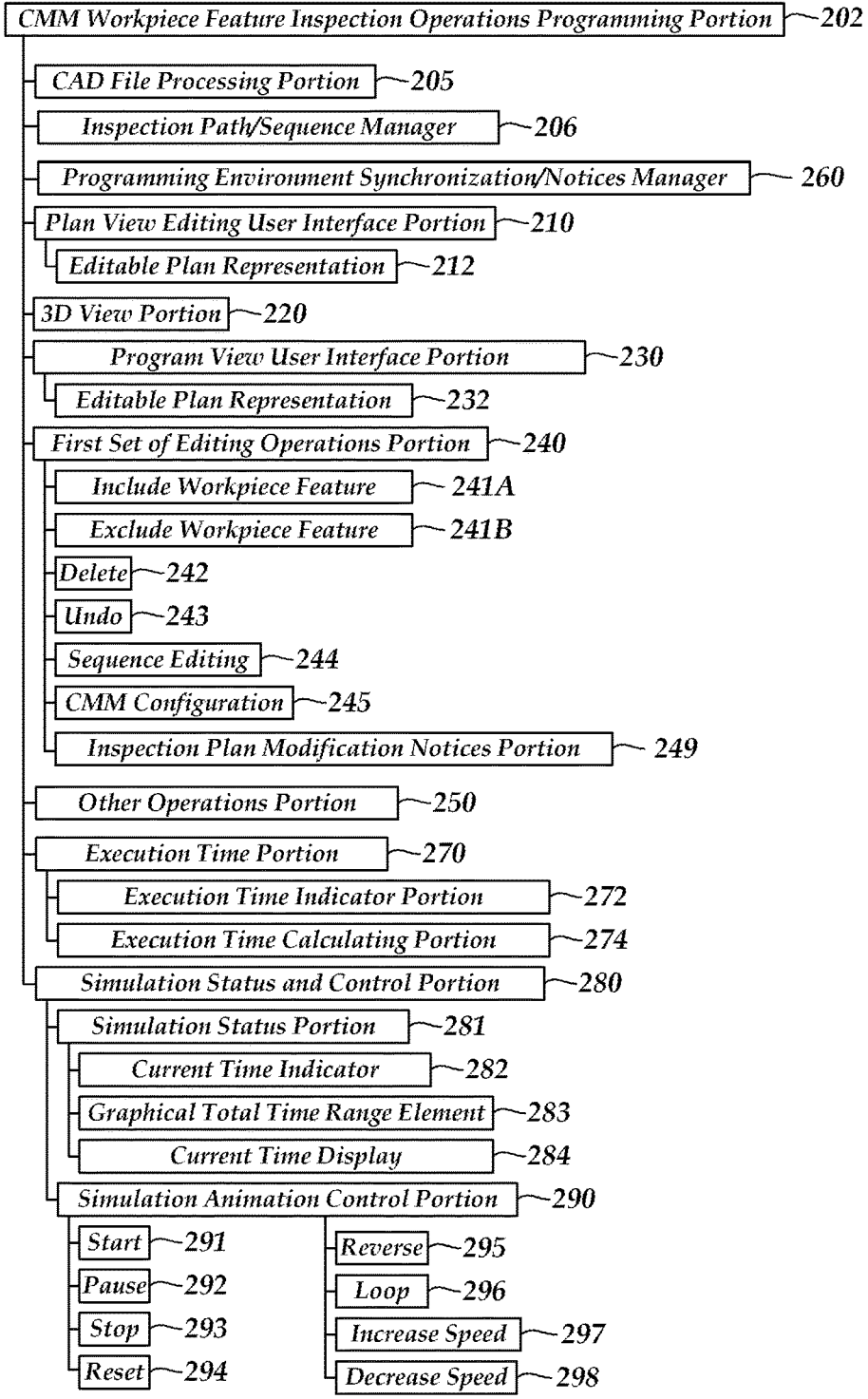

FIGS. 2A and 2B are diagrams of a computing system 105 including various elements of one embodiment of a programming portion 202 on which workpiece feature inspection operations may be programmed for a CMM (e.g., the CMM body 2 of FIG. 1). As shown in FIG. 2A, in various implementations the computing system 105 (e.g., the computer 5 of FIG. 1 or a separate computer) may include a memory portion 170, a display portion 175, a processing portion 180, an input-output devices portion 185 and the programming portion 202. The memory portion 170 includes resident programs and other data utilized by the computing system 105. The display portion 175 provides the display for the computing system 105 (e.g., similar to the display unit 5D of FIG. 1), including the features provided by the programming portion 202. The processing portion 180 provides for the signal processing and control of the computing system 105, while the input-output devices portion 185 receives and provides control signals and outputs to and from various devices (e.g., the CMM controller 3 of FIG. 1).

As shown in FIGS. 2A and 2B, in one embodiment, the programming portion 202 includes a CAD file processing portion 205, an inspection path and/or sequence manager 206, a plan view editing user interface portion 210, a 3-D view portion 220, a program view editing user interface portion 230, a first set of operations portion 240, which may include an inspection plan modification notices portion 249, another operations portion 250, a programming environment synchronization and/or notices manager 260, an execution time portion 270, and a simulation status and control portion 280. In various implementations, the computer-aided design (CAD) file processing portion 205 inputs a workpiece CAD file corresponding to a workpiece (e.g., the workpiece 10 of FIG. 1) and analyzes the file to automatically determine workpiece features on the workpiece corresponding to a plurality of geometric feature types (e.g., cylinder, plane, sphere, cone, etc.) and the inspection path/sequence manager 206 may automatically determine a motion control path that allows the CMM to obtain measurements that characterize the workpiece features. Methods usable for implementing the CAD file processing portion 205 and/or the inspection path/sequence manager 206 are known in the art, as exemplified in various commercial CAD products, and/or in CAD "extension programs" for creating inspection programs and/or other known CMM inspection programming systems and/or systems which automatically generate machine tool programs from CAD data. For example, U.S. Pat. Nos. 5,465,221; 4,901,253; 7,146,291; 7,783,445; 8,302,031; 5,471,406 and 7,058,472, each of which is hereby incorporated herein in their entirety, disclose various methods which may be used to analyze CAD data and determine geometric features of a workpiece, and then automatically generate a motion control path for placing a probe or sensor at inspection points that measure or characterize the geometric features. European Patent Number EP1330686 also provides relevant teachings. In some embodiments, determining the geometric features may simply comprise extracting or recognizing the categorized geometric features inherently defined in some modern CAD systems. In some embodiments, product and manufacturing information (PMI, for short) is present in the CAD data, and may be used in the aforementioned processes. PMI conveys non-geometric attributes in CAD data, and may include geometric dimensions and tolerances, surface finish, and the like. In some embodiments, in the absence of PMI, default tolerances and other default inspection rules may be used to in automatic operations of the CAD file processing portion 205 and the inspection path/sequence manager 206.

The motion control path may generally define a feature inspection sequence as well as individual inspection points (e.g., touch probe measurement points, or non-contact measurement points, or point cloud determination regions, etc.), as well as the motion path between such points. The sequence and motion path planning may follow simple rules that avoid collisions in some embodiments, or more complicated rules or processes that both avoid collisions and optimize motion path length or inspection time in other embodiments. In some embodiments, the CAD file processing portion 205 may include the inspection path/sequence manager 206, or they may be merged and/or indistinguishable. Applicable automatic path planning methods may be found in commercial products and/or the previously cited references, as well as in numerous technical and/or academic articles. In one embodiment, one or both of the aforementioned automatic processes maybe automatically triggered when a target CAD file is identified in the programming portion 202. In other embodiments, one or both of the aforementioned automatic processes maybe triggered in relation to a target CAD file based on operator input that initiates the processes. In other less desirable embodiments, similar processes may be semi-automatic and require user input in the programming portion 202 for certain operations or decisions.

In any case, in various embodiments the aforementioned processes may, in effect, may be used to provide a comprehensive inspection plan and/or inspection program for a workpiece. In some contexts, the connotations of the term "inspection plan" may encompass primarily what features are to be inspected and what measurements are to be made on each, and in what sequence, and the connotations of the term "inspection program" may primarily encompass how the inspection plan is to be accomplished on a particular CMM configuration (e.g., following the "instructions" inherent in the inspection plan, but also including the motion speeds and path, the probe or sensor to be used, and so on for a defined CMM configuration.) Other portions of the programming portion 202 may use the results of the CAD file processing portion 205 and the inspection path/sequence manager 206 to perform their operations and populate and/or control their associated user interface portions, and the like. As shown in FIG. 2B, the plan view editing user interface portion 210 includes an editable plan representation 212 of a workpiece feature inspection plan for the workpiece corresponding to the CAD file. In various implementations, the program view editing user interface portion 230 may also (or instead) include an editable plan representation 232, as will be described in more detail below with respect to FIGS. 3-10.

Although it has been known to attempt to automatically generate an inspection plan and/or inspection program, subsequent editing and visualization of that plan and/or program have not been sufficiently intuitive or easy to use—particularly for relatively unskilled users. In particular, visualization of the effect of editing changes to the plan and/or program has not been immediately or continuously available in the user interface (e.g., through a displayed "3-D" simulation or moving animation). Rather, it has been typical to require the user to activate a special mode or display window that is not normally active in real time during editing operations in order to see a "recording" or specially generated simulation of the CMM running the edited inspection program. Similarly, the effect of editing changes to the plan and/or program on the total execution time of the inspection plan or program has not been immediately or continuously available in real time in the user interface during editing operations. Both types of "results" feedback—"immediate" visual confirmation of the editing results in a 3-D simulation or animation view, and/or immediate confirmation of the editing results on the total execution time—may be critical to the acceptance of an editing operation. For example, the total execution time relates directly to the inspection throughput of a CMM, which determines its cost of ownership and/or ability to support a desired rate of production.

Due to the value of such immediate feedback, particularly for relatively unskilled users or program editors, in some embodiments it is desirable for editing operations to be immediately incorporated (e.g., automatically or with very minimal effort by the user) into the current version of the inspection plan and/or inspection program, which is then reflected in the various portions of the programming portion 202 and its user interface(s). In the illustrated embodiment, this may be accomplished through the operations of the programming environment synchronization/notices manager 260, which in one embodiment may be implemented using known "publisher-subscriber" methods, which are sometimes implemented using XML-like languages (e.g., as used for notifications between web pages). In various embodiments, a publisher-subscriber method may be implemented by adapting methods such as a list-based method, or a broadcast-based method, or a content-based method to support the features disclosed herein. In a CMM programming environment, the publishers and subscribers are generally located in the same processing space, and it is possible for the identity of the "subscriber" windows to be known by the "publisher" (e.g., as may be recorded or implemented using the programming environment synchronization/notices manager 260, for example.) Applicable to such cases, U.S. Pat. No. 8,028,085, which is hereby incorporated herein by reference in its entirety, describes low latency methods which may be adapted to support the features disclosed herein.

In one embodiment, determining and/or generating various workpiece features and measurement operations in the CAD file processing portion 205 and the inspection path/sequence manager 206 may include generating and/or sharing a unique identifier for each workpiece feature and measurement operation. When the results from those portions are used in other portions of the programming portion 202 (e.g., as outlined above), the various identifiers may also be used or cross-referenced in the other portions to establish relevant associations between corresponding workpiece features and/or inspection operations across the various processing and/or user interface portions.

The user interface of the programming portion 202 includes a first set of operations (which also include the underlying programming instructions and/or routines) usable to edit the workpiece feature inspection plan and/or inspection program. For example, the user interface operations may include selections of text or graphical elements that represent workpiece features or inspection operations, followed by activation of relevant commands or other user interface operations that affect the selected elements. In one embodiment, the first set of operations portion 240 may provide or identify such operations. In one embodiment, the inspection plan modification notices portion 249 may be responsive to operations included in the first set of operations portion 240 to provide a notice to the programming environment synchronization/notices manager 260 that an inspection plan modification is taking place.

In response, the programming environment synchronization/notices manager 260 may then (e.g., automatically) manage the exchange of various event or programming operation notifications and related unique identifiers, such that the CAD file processing portion 205 and/or the inspection path/sequence manager 206 appropriately edit or modify the current inspection plan and inspection program in a synchronized manner when one of the first set of operations is performed. Such plan and program modifications may be performed very quickly in various embodiments, because the unique identifiers described above may be used to efficiently focus the modifications on only those features and/or measurement operations affected by the currently active one of the first set of operations. After that, the programming environment synchronization/notices manager 260 may notify other portions of the programming portion 202 (e.g., as outlined above), so that they are immediately updated using information from the edited plan and/or program. The unique identifier(s) of the most recently edited elements may again be used to speed up such operations, in that the updating need only focus on those elements associated with the identifiers.

It should be appreciated that the programming environment synchronization/notices manager 260 may also manage inter-portion communications and exchanges besides those associated with the first set of operations (e.g., using various techniques and identifiers similar to those outlined above.) In various embodiments, it may facilitate the synchronization between the various user interface windows or portions of the programming portion 202. For example, selection of a particular feature or instruction in one window may automatically trigger a notification or instruction to other windows to display a corresponding feature or instruction in that other window, or depict a program operating state associated with the selected feature or instruction, or the like.

It will be appreciated that the embodiment(s) outlined above for achieving real-time editing operation synchronization between various portions of the programming portion 202 is exemplary only, and not limiting. For example, the function of the identifiers outlined above may be provided by suitable database or lookup table associations or the like, without the presence of an explicit "identifier". These and other alternatives will be apparent to one of ordinary skill in the art based on the teachings disclosed herein.

The execution time portion 270 may include an execution time indicator portion 272 and an execution time calculating portion 274. In order to provide valuable feedback to a user performing editing operations, the execution time indicator portion 272 may provide a "real-time" indication of an estimated inspection program execution time for operating the CMM to execute a workpiece inspection program corresponding to the current workpiece feature inspection plan as executed by a current CMM configuration. Using the techniques outlined above, the programming portion 202 may be configured such that the execution time indicator portion 272 is automatically updated in response to a utilization of one of the operations included in the first set of operations portion 240 to modify the current workpiece feature inspection plan, so as to automatically indicate the estimated effect of the modification on the inspection program execution time. In various implementations, the first set of editing operations portion 240 may include or identify operations corresponding to inclusion of a workpiece feature 241A, exclusion of a workpiece feature 241B, a delete command 242, an undo command 243, sequence editing 244 and altering a CMM configuration 245, each of which will be described in more detail below with respect to FIGS. 3-10. The first set of editing operations portion 240 may further include or identify operations corresponding to adding or deleting individual measurement points (e.g., touch points for a stylus) on a feature, or changing the motion plan for traversing between individual measurement points, or the like. Another operations portion 250 may include other operations relevant to the use and functioning of the programming portion 202 and/or general computing system 105. The 3-D view portion 220 may display a 3-D view including workpiece features on the workpiece and an indication of inspection operations to be performed on the workpiece features according to the current workpiece feature inspection plan. The simulation status and control portion 280 may include a simulation status portion 281 that is configured to characterize a state of progress through the current workpiece feature inspection plan corresponding to a currently displayed 3-D view, and the execution time indicator portion 272 may be displayed in conjunction with the simulation status portion 281.

In various implementations, as will be illustrated and described in more detail below with respect to FIGS. 3-10, the simulation status portion 281 may include a current time indicator 282 that moves along a graphical total time range element 283 to characterize a state of progress through the current workpiece feature inspection plan corresponding to the currently displayed 3-D view, and the execution time indicator 272 may be displayed in association with the graphical total time range element 283. In one implementation, the simulation status portion 281 further includes a current time display 284 which includes a numerical time representation that is automatically updated corresponding to the current time indicator 282 or the currently displayed 3-D view, and that further characterizes the state of progress through the current workpiece feature inspection plan corresponding to the currently displayed 3-D view. In one implementation, the simulation status and control portion 280 further includes a simulation animation control portion 290 which includes elements that are usable to control at least one of a start 291, pause 292, stop 293, reset 294, reverse 295, loop 296, increase in speed 297 or decrease in speed 298 of an animated display of simulated progress through the current workpiece feature inspection plan as displayed in the 3-D view.

In various implementations, the computing system 105 and/or other associated computer system(s) may include suitable unitary or distributed computing systems or devices, which may include one or more processors that execute software to perform the functions described herein. Processors include programmable general-purpose or special-purpose microprocessors, programmable controllers, application specific integrated circuits (ASICs), programmable logic devices (PLDs), or the like, or a combination of such devices. Software may be stored in memory, such as random access memory (RAM), read-only memory (ROM), flash memory, or the like, or a combination of such components. Software may also be stored in one or more storage devices, such as disk drives, solid-state memories, or any other medium for storing data. Software may include one or more program modules which include routines, programs, objects, components, data structures, and so on that perform particular tasks or implement particular abstract data types. In distributed computing environments, the functionality of the program modules may be combined or distributed across multiple computing systems or devices and in various implementations may be accessed via service calls.

Figure 3:
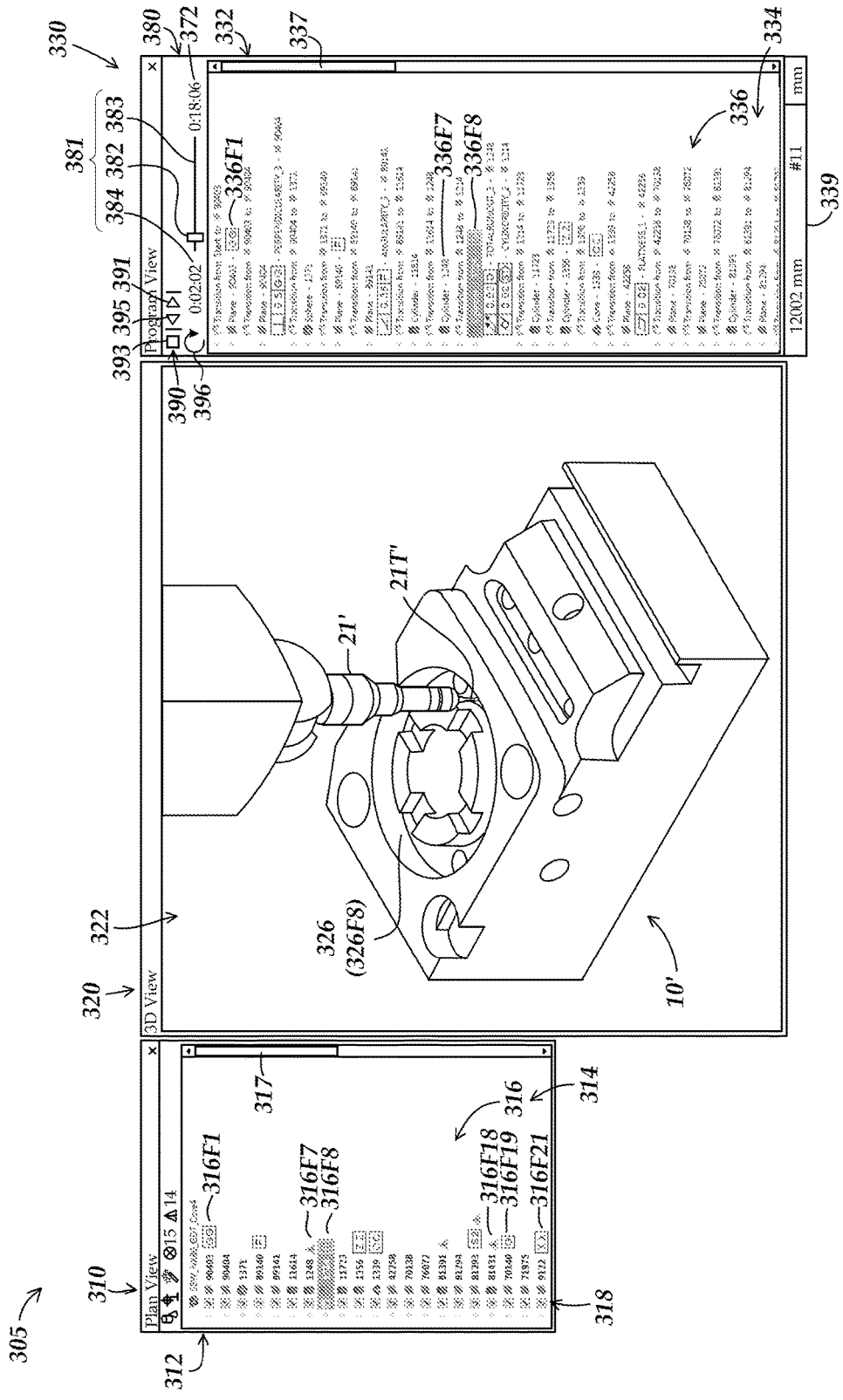
FIG. 3 is a diagram of a user interface in which all of the workpiece features of an editable plan representation are included in a set of workpiece features to be inspected according to the plan.

FIG. 3 is a diagram of a user interface 305 (e.g., as may be shown on the display unit 5D of FIG. 1, the display portion 175 of FIG. 2, etc.) It will be appreciated that certain numbered elements 3XX of the user interface 305 may correspond to and/or be provided by similarly numbered elements 2XX of FIGS. 2A and 2B, except as otherwise described below. In the implementation shown in FIG. 3, the user interface 305 includes a plan view window 310, a 3-D view window 320 and a program view window 330. The plan view window 310 includes an editing user interface portion 312, the 3-D view window 320 includes a workpiece inspection program simulation portion 322, and the program view window 330 includes an editing user interface portion 332 and a simulation status and control portion 380. The editing user interface portions 312 and 332 each include plan representations 314 and 334, respectively, of a workpiece feature inspection plan for a workpiece 10 corresponding to a CAD file. The plan representation 314 is organized in terms of geometric features to be inspected on the workpiece. The plan representation 334 is organized as inspection program pseudo-code or actual code or graphical program operation representations or the like, in various embodiments. In the illustrated embodiment, each or both of the plan representations 314 and 334 are editable (that is, they are editable plan representations.) When editing operations are performed for one of the editable plan representations 314 and 334, the other plan representation may be automatically updated in a manner consistent with those editing operations by operation of the various system elements illustrated and described with respect to FIGS. 2A and 2B. However, in some embodiments, only one of the plan representations 314 and 334 need be editable. In such a case, the other plan representation may be absent, or hidden, or may be displayed and automatically updated in a manner similar to that outlined above.

As described above with respect to FIGS. 2A and 2B, in various implementations, a computer-aided design (CAD)

file processing portion may input a workpiece CAD file corresponding to a workpiece 10 and may analyze the file to automatically determine inspectable workpiece features on the workpiece 10 corresponding to a plurality of geometric feature types (e.g., cylinder, plane, sphere, cone, etc.) In FIG. 3 the editing user interface portions 312 and 332 include editable plan representations 314 and 334 of the workpiece feature inspection plan for the workpiece 10 corresponding to the CAD file, wherein the editable plan representations 314 and 334 include the editable set of workpiece features 316 and 336 to be inspected. As will be described in more detail below, an execution time indicator 372 is provided that is indicative of an estimated inspection program execution time for operating the CMM to execute a workpiece inspection program corresponding to the current workpiece feature inspection plan as executed by a current CMM configuration. A first set of operations is usable to edit the workpiece feature inspection plan, and the system is configured such that the execution time indicator 372 is automatically updated in response to a utilization of one of the first set of operations to modify the current workpiece feature inspection plan, so as to automatically indicate the estimated effect of the modification on the inspection program execution time.

The 3-D view window 320 displays a 3-D view of the workpiece inspection program simulation portion 322 including workpiece features 326 (e.g., a cylinder workpiece feature 326F8) on the workpiece 10' and an indication of inspection operations to be performed on the workpiece features 326 according to the current workpiece feature inspection plan. In the example of FIG. 3, the 3-D view shows a touch probe 21' having a stylus 21T', which is positioned relative to a workpiece 10'. In the state illustrated, the touch probe stylus 21T' is contacting a cylinder workpiece feature 326F8, which corresponds to the workpiece features 316F8 and 336F8 which are highlighted in the editable plan representations 314 and 334, respectively. In the editable plan representation 334 the workpiece feature 336F8 includes a description of "cylinder-1214" along with a displayed cylinder icon, and in the editable plan representation 314 the workpiece feature 316F8 includes a description of "1214" along with a displayed cylinder icon. Such descriptions and icons may be automatically generated and displayed as corresponding to a numbered designation and geometric type (e.g., cylinder, plane, sphere, cone, etc.) for each of the workpiece features.

The simulation status and control portion 380 may include a simulation status portion 381 and a simulation animation control portion 390. Using synchronization techniques outlined above, for example, the simulation status portion 381 may be configured to characterize a state of progress through the current workpiece feature inspection plan corresponding to a currently displayed 3-D view of the workpiece inspection program simulation portion 322. In various implementations, the simulation status portion 381 may include a current time indicator 382 that moves along a graphical total time range element 383 to characterize a state of progress through the current workpiece feature inspection plan corresponding to the currently displayed 3-D view, and the execution time indicator 372 may be displayed in association with the graphical total time range element 383. In one implementation, as illustrated in the example of FIG. 3, the execution time indicator 372 may be displayed in the vicinity of the right-hand end of the graphical total time range element 383.

In one implementation, the simulation status portion 381 may further include a current time display 384 displayed in the vicinity of at least one of the current time indicator 382 or the total time range element 383, and the current time display 384 may include a numerical time representation that is automatically updated corresponding to the current time indicator 382 or the currently displayed 3-D view, and that further characterizes the state of progress through the current workpiece feature inspection plan corresponding to the currently displayed 3-D view. In the example of FIG. 3, the current time display 384 indicates a time of "0:02:02" out of a total time indicated by the execution time indicator 372 of "0:18:06", and the current time indicator 382 is shown at a proportional position along the total time range element 383. This position of the current time indicator 382 and the time of the current time display 384 correspond to the current state of progress through the current workpiece feature inspection plan, which relative to the editable plan representation 314 indicates that the workpiece feature 316F8 is being inspected after having completed the corresponding inspections of workpiece features 316F1-316F7. Correspondingly, relative to the editable plan representation 334 this indicates that the workpiece feature 336F8 is being inspected after having completed the corresponding inspections of workpiece features 336F1-336F7. In one implementation, the simulation animation control portion 390 may include elements that are usable to control an animated display of simulated progress through the current workpiece feature inspection plan as displayed in the 3-D view. For example, a start element 391, stop element 393, reverse element 395 and loop element 396 are illustrated in the simulation animation control portion 390, although it will be appreciated that in other implementations other elements (e.g., corresponding to pause, reset, increase speed, decrease speed, etc.) may also be included.

As will be described in more detail below, the editable plan representation 314 that is illustrated in FIGS. 3-10 includes forty-six workpiece features 316F1-316F46 on the workpiece 10' that may be inspected. The workpiece features 316F1-316F46 correspond to workpiece features 326F1-326F46 on the workpiece 10' in the workpiece inspection program simulation portion 322, and to workpiece features 336F1-336F46 in the editable plan representation 334. In order to simplify the figures, only some of the workpiece features are labeled. In the example of FIG. 3, the workpiece features 316F1-316F21 are currently visible in the plan view window 310, wherein a user may utilize controls to increment or scroll down (e.g., utilizing a vertical scroll bar 317, etc.) to view additional workpiece features (e.g., as will be illustrated and described in more detail below with respect to FIGS. 6 and 9). In the example of FIG. 3, the workpiece features 336F1-336F8 et seq. are currently visible in the program view window 330, wherein a user may utilize controls to increment or scroll down (e.g., utilizing a vertical scroll bar 337, etc.) to view additional workpiece features.

With respect to the first set of operations that is usable to edit the workpiece feature inspection plan, in one implementation the editing user interface portion 312 may include workpiece feature exclusion/inclusion elements 318 (e.g., checkboxes next to each of the workpiece features 316) that operate to toggle between an exclusion state (e.g., with the associated box unchecked) and an inclusion state (e.g., with the associated box checked) for each associated workpiece feature 316. An exclusion state may correspond to an exclusion of the associated workpiece feature 316 from the set of workpiece features to be inspected, and an inclusion state may correspond to an inclusion of the associated workpiece feature 316 in the set of workpiece features to be inspected. In the example of FIG. 3, all of the workpiece features 316 have been selected for inclusion. In various implementations, the first set of operations may include a utilization of the workpiece feature exclusion/inclusion elements 318 to either exclude or include workpiece features 316 with respect to the set of workpiece features to be inspected, and the execution time indicator 372 may automatically be updated in response to a utilization of a workpiece feature exclusion/inclusion element 318, as will be described in more detail below with respect to FIGS. 4 and 5.

Figure 4:
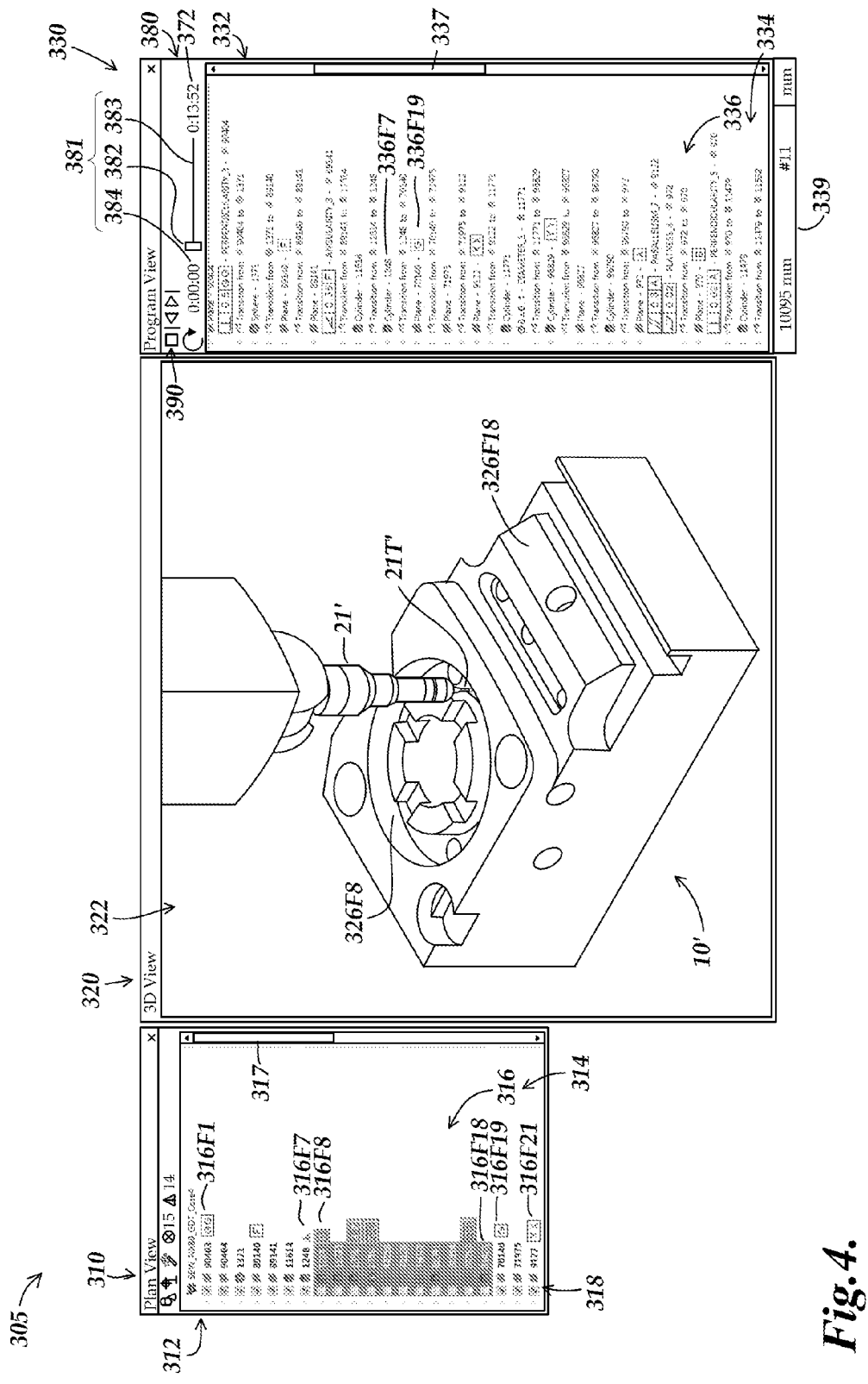
FIG. 4 is a diagram of a user interface in which some of the workpiece features of FIG. 3 have been unselected so as to be excluded from the set of workpiece features to be inspected according to the plan.

FIG. 4 is a diagram of the user interface 305 of FIG. 3 in which some of the workpiece features 316 have been unselected so as to be excluded from the set of workpiece features to be inspected. More specifically, as illustrated in FIG. 4, for the workpiece features 316F8-316F18, the corresponding workpiece feature exclusion/inclusion elements 318 have all been unchecked. As a result, the workpiece features 316F8-316F18 are no longer included in the set of workpiece features to be inspected. This is illustrated in the editable plan representation 334, for which the workpiece feature 336F7 is shown to be followed by the workpiece feature 336F19, with the workpiece features 336F8-336F18 no longer being included. This may be contrasted with the state of the editable plan representation 334 illustrated in FIG. 3, for which the workpiece feature 336F7 is shown to be followed by the workpiece feature 336F8, etc.

As a result of the unselecting of the workpiece features 316F8-316F18, in real time the exclusion time indicator 372 indicates a reduced time of "0:13:52", as compared to the previously indicated time of "0:18:06" of FIG. 3. This reduction in the displayed execution time indicates the estimated effect of the editing modification on the inspection program execution time. In this manner, real-time feedback related to the throughput effects of editing operations is provided in the editing environment such that a user may be made aware of the estimated effect of such modifications on the workpiece feature inspection plan. This may be useful for the user when determining tradeoffs between the thoroughness of inspection operations in comparison to the resulting throughput on an inspection machine, especially when inspections are automatically programmed based on the selected set of workpiece features. Such automatic programming operations may produce unexpected reductions or increases in inspection time (e.g., due to required probe or stylus change operations associated with a feature), and timely indication of such throughput effects may make inspection plan editing much more effective and efficient—particularly when it is displayed in a convenient and intuitive manner in the user interface. In contrast to embodiments within the scope of this disclosure, previously known CMM programming environments have not operated to determine the execution time effects of editing operations in a timely, or real-time, manner, or indicate those execution time effects in a user-friendly and convenient manner in the user interface.

With respect to the 3-D view window 320, in various implementations, the highlighting of the workpiece features 316F8-316F18 in the editable plan representation 314 may correspondingly result in the workpiece features 326F8-326F18 also being highlighted or otherwise marked. In order to simplify the illustrations in FIG. 3, only the workpiece features 326F8 and 326F18 are labeled in the 3-D view window 320.

Figure 5:
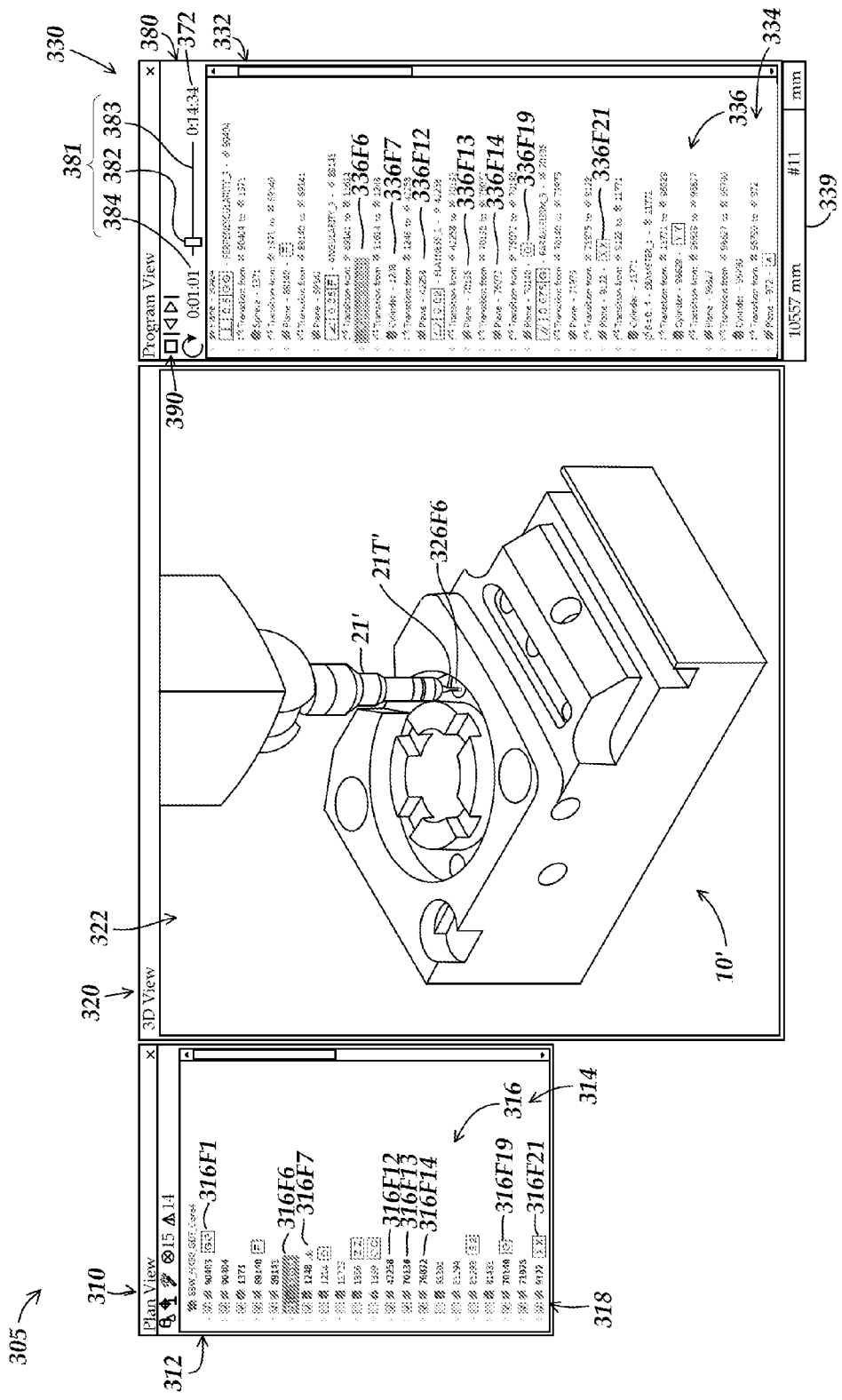
FIG. 5 is a diagram of a user interface in which some of the excluded workpiece features of FIG. 4 have been reselected so as to be reincluded in the set of workpiece features to be inspected according to the plan.

FIG. 5 is a diagram of the user interface 305 in which some of the excluded workpiece features 316 of FIG. 4 have been reselected so as to be reincluded the set of workpiece features to be inspected. More specifically, as shown in FIG. 5, the workpiece features 316F12-316F14 are shown as having their corresponding workpiece feature exclusion/inclusion elements 318 rechecked so as to be reselected for inclusion in the set of workpiece features to be inspected. As a result, as illustrated in the editable plan representation 334, the workpiece feature 336F7 is now followed by the workpiece features 336F12-336F14, which are subsequently followed by the workpiece feature 336F19, etc. As a result of this modification, the execution time indicator 372 is shown to indicate a time of "0:14:34", which is an increase from the indicated time of "0:13:52" of FIG. 4, as corresponding to the additional time required for inspecting the workpiece features 336F12-336F14 as re-included in the set of workpiece features to be inspected.

As also illustrated in FIG. 5, a cylinder workpiece feature is highlighted, as corresponding to the workpiece feature 316F6 of the editable plan representation 314, the workpiece feature 326F6 of the 3-D view window 320 and the workpiece feature 336F6 of the editable plan representation 334. The current time display 384 is shown to correspondingly indicate a time of "0:01:01" out of a total time indicated by the execution time indicator 372 of "0:14:34", and the current time indicator 382 is shown to be at a proportional position along the graphical total time range element 383. This indicates that the inspection of the workpiece feature 326F6 occurs approximately at the time "0:01:01" after the inspection of the workpiece features 326F1-326F5 has been completed.

In various implementations, as an alternative or in addition to the workpiece feature exclusion/inclusion elements 318 described above with respect to FIGS. 3-5, additional elements and/or commands may be provided. For example, the editing user interface portion 312 or 332 may include a delete command usable to delete a currently selected workpiece feature 316 or 336 from the set of workpiece features to be inspected. In such an implementation, the first set of operations may include a utilization of the delete command, and the execution time indicator 372 may automatically be updated in response to a utilization of the delete command. As another example, the editing user interface portion 312 or 332 may include an undo command usable to undo a previously executed operation. In such an implementation, the first set of operations may include a utilization of the undo command to undo a previously executed operation included in the first set of operations, and the execution time indicator 372 may automatically be updated in response to a utilization of the undo command.

Figure 6:
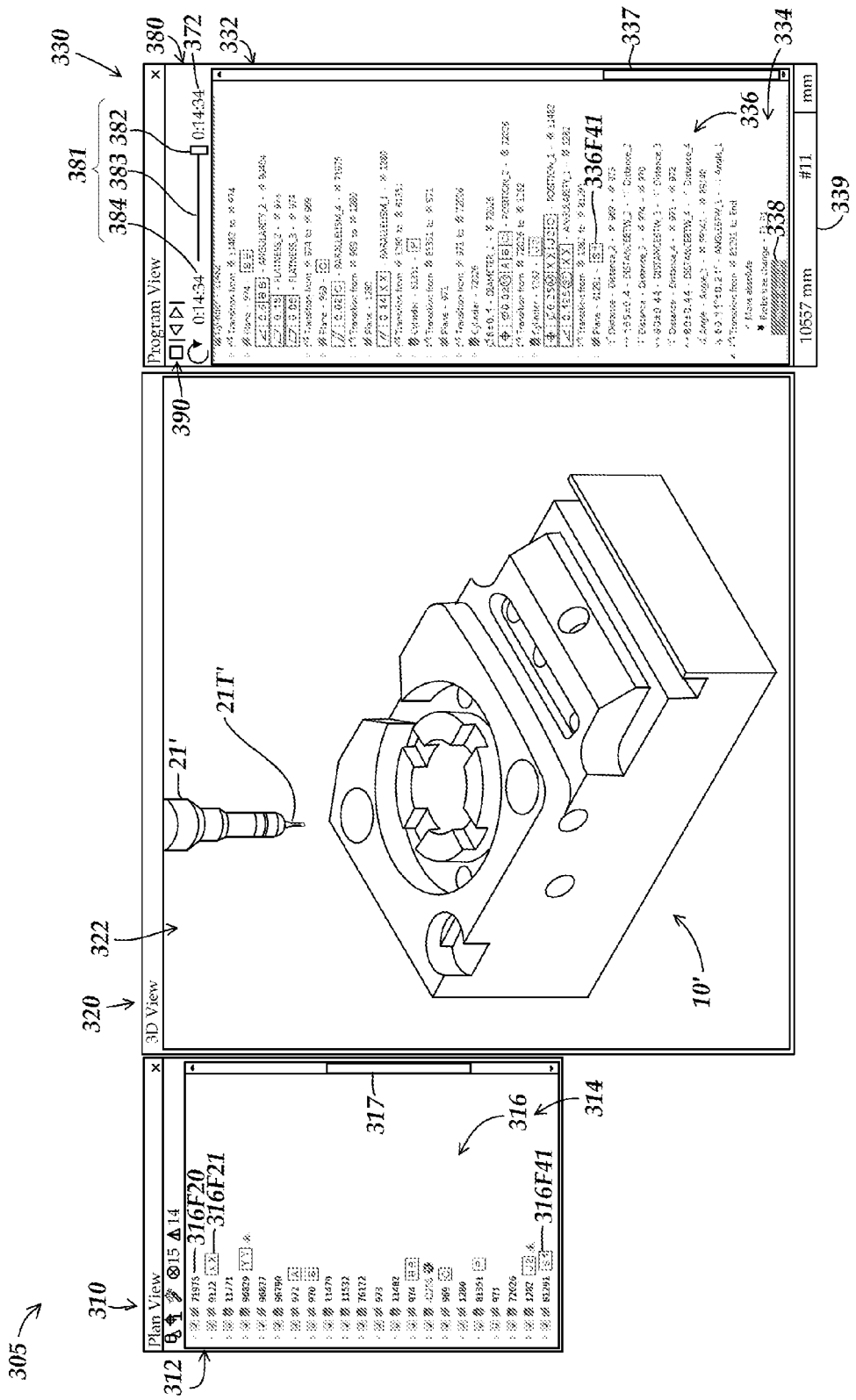
FIG. 6 is a diagram of a user interface displaying the end of a workpiece feature inspection plan.

FIG. 6 is a diagram of the user interface 305 displaying the end of the workpiece feature inspection plan. As shown in FIG. 6, the editable plan representation 334 shows a program element 338 (i.e., with a description of "move absolute") as being highlighted, which corresponds to the end of the workpiece feature inspection plan. The current time display 384 correspondingly indicates a time of "0:14:34" out of a total time indicated by the execution time indicator 372 of "0:14:34". The current time indicator 382 is correspondingly shown to be at the end of the graphical total time range element 383. In the 3-D view window 320, the probe 21 is shown as backed away from the workpiece 10', as may occur at the end of the workpiece feature inspection plan.

Figure 7:
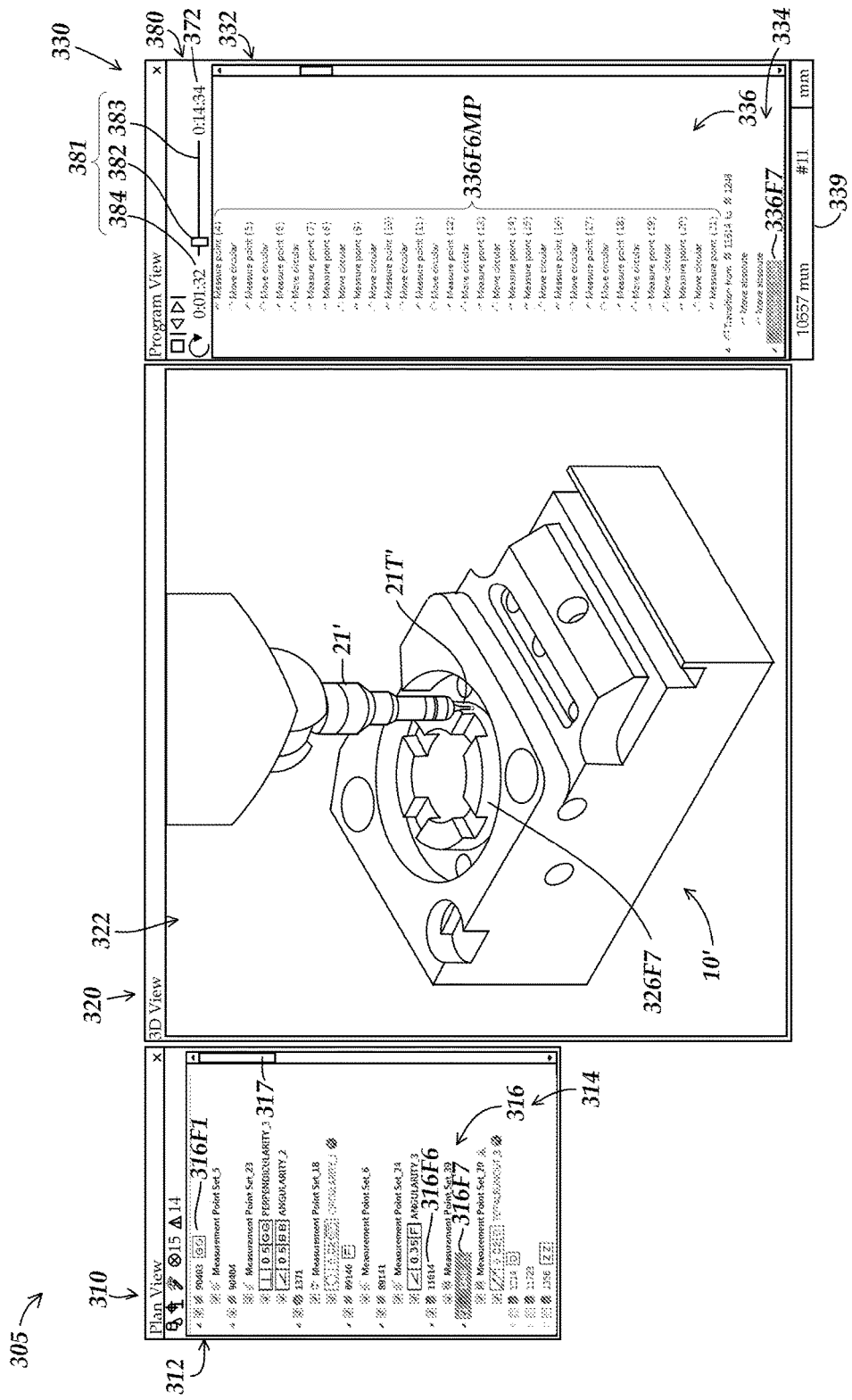
FIG. 7 is a diagram of a user interface in which additional detail is displayed regarding the editable plan representation and an example cylindrical workpiece feature is highlighted.

FIG. 7 is a diagram of the user interface 305 in which additional detail is displayed regarding the editable plan representations 314 and 334 and an example cylindrical workpiece feature is highlighted. As shown in FIG. 7, the additional detail for the editable plan representations 314 and 334 includes information about specific measurement points, movements, angles, etc., for the performance of the inspections of the designated workpiece features. For example, in the editable plan representation 334, a set of twenty-one measurement points 336F6MP is illustrated with respect to the inspection of the workpiece feature 336F6.

The highlighted cylindrical workpiece feature is shown to correspond to the workpiece feature 316F7 in the editable plan representation 314, the workpiece feature 326F7 in the 3-D view window 320, and the workpiece feature 336F7 in the editable plan representation 334. In various implementations, the corresponding measurement points or other inspection elements for a highlighted workpiece feature may be illustrated relative to the workpiece feature 326 in the 3-D view window 320. Corresponding to the highlighted workpiece feature 336F7, the current time display 384 is shown to indicate a time of "0:01:32" out of a total time indicated by the execution time indicator 372 of "0:14:34", and the current time indicator 382 is shown to be at a proportional position across the graphical total time range element 383. This indicates that the inspection of the workpiece feature 336F7 occurs approximately at the time "0:01:32", after the inspection of the workpiece features 336F1-336F6 has been completed.

Figure 8:
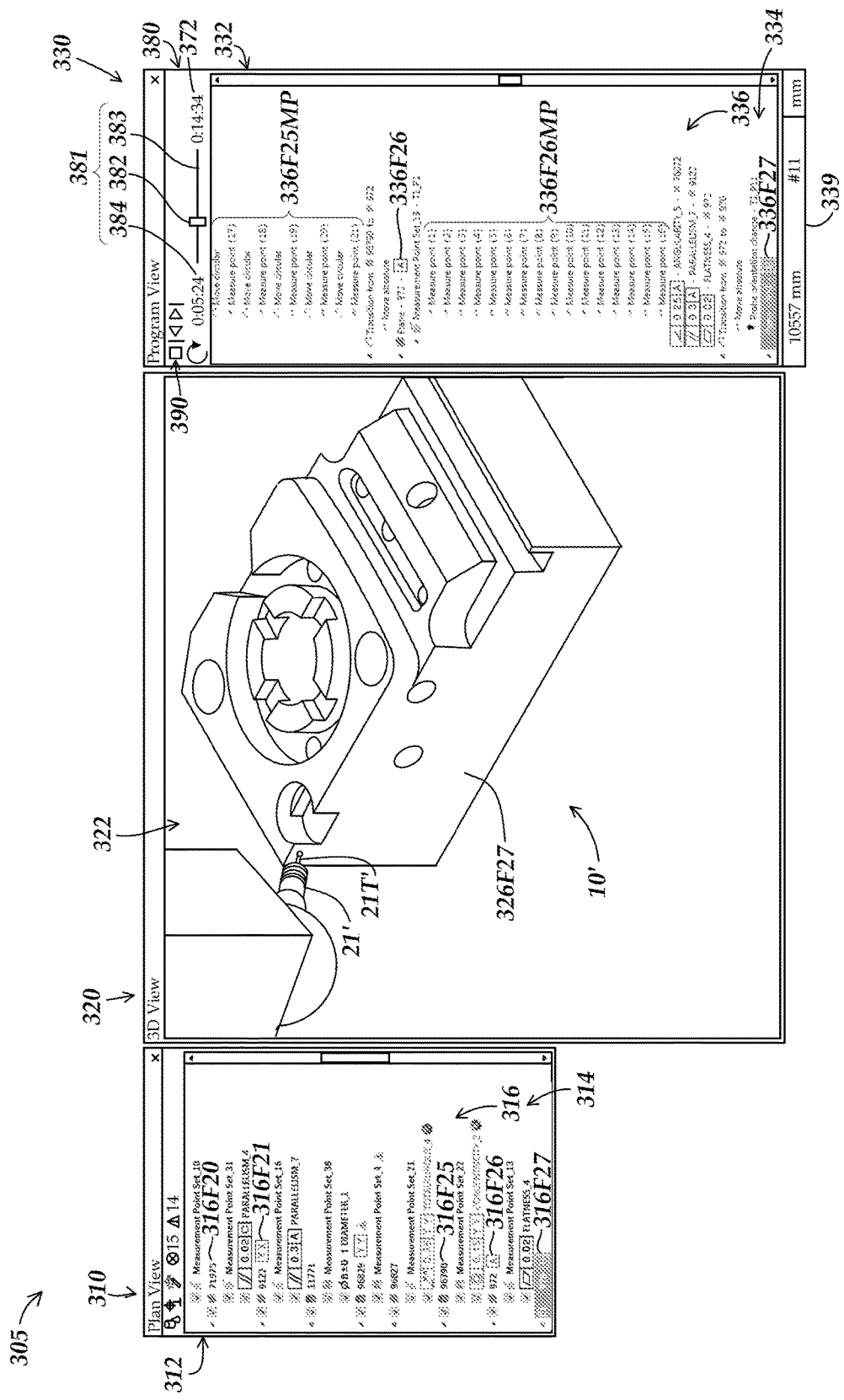
FIG. 8 is a diagram of a user interface in which additional detail is displayed regarding the editable plan representation and an example planar workpiece feature is highlighted.

FIG. 8 is a diagram of the user interface 305 in which an example plane workpiece feature has been highlighted. As shown in FIG. 8, the plane workpiece feature corresponds to the workpiece feature 316F27 in the editable plan representation 314, the workpiece feature 326F27 in the 3-D view window 320, and the workpiece feature 336F27 in the editable plan representation 334. In the 3-D view window 320, the probe 21' and stylus 21T' are illustrated as positioned for beginning the inspection of the plane workpiece feature 326F27. The current time display 384 is shown to correspondingly indicate a time of "0:05:24" out of a total time indicated by the execution time indicator 372 of "0:14:34", and the current time indicator 382 is shown at a proportional position along the graphical total time range element 383. This indicates that the inspection of the workpiece feature 336F27 occurs approximately at the time "0:05:24", after the inspection of the previous workpiece features has been completed.

Figure 9:
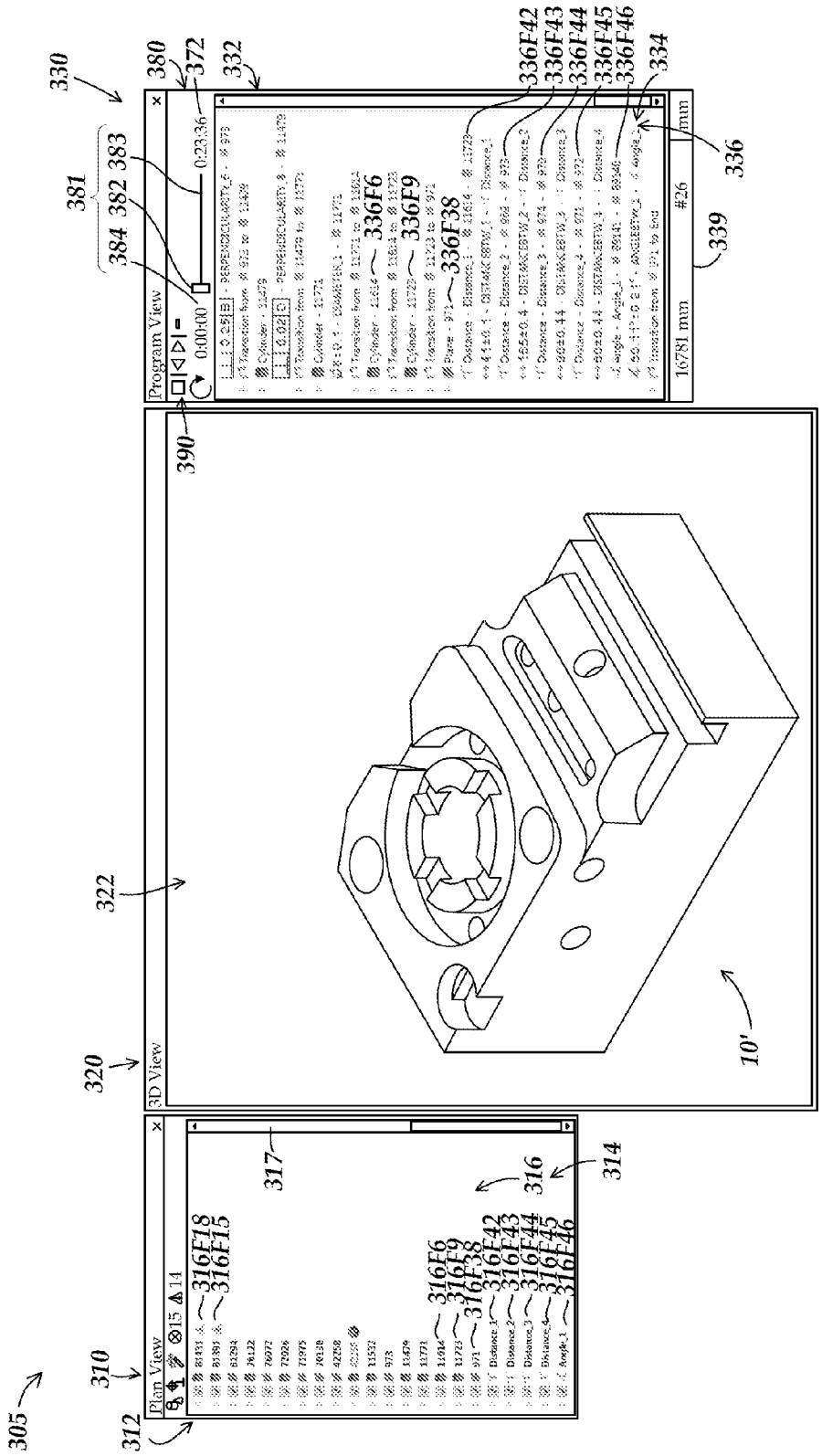
FIG. 9 is a diagram of a user interface illustrating a state of the editable plan representation prior to a sequence editing operation being performed.
Figure 10:
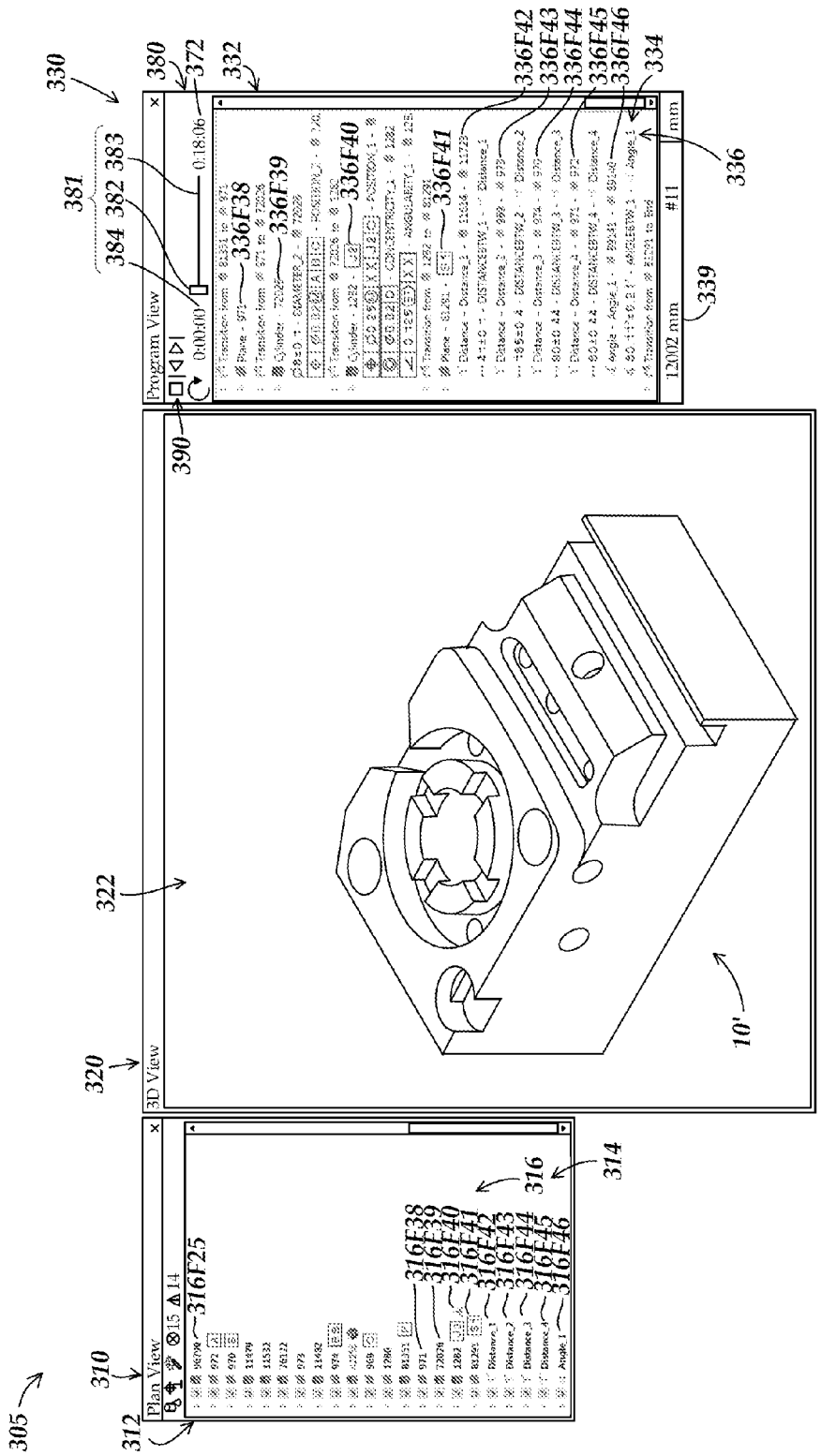
FIG. 10 is a diagram of a user interface illustrating a state of the editable plan representation after performing a sequence editing operation.

FIGS. 9 and 10 are diagrams of the user interface 305 illustrating a state of the editable plan representations 314 and 334 before and after one or more sequence editing operations have been performed, respectively. As shown in FIG. 9, the workpiece features included in the editable plan representations 314 and 334 are shown in a different order than has previously been illustrated and described with respect to FIGS. 3-8. The state of FIG. 9 generally corresponds to a time before one or more sequence editing operations have been performed to improve the efficiency for operating the CMM to execute the workpiece inspection program corresponding to the current workpiece feature inspection plan. The different order of the workpiece features in the editable plan representation 314 is illustrated in part by the workpiece feature 316F6 being followed by the workpiece feature 316F9, which is followed by the workpiece feature 316F38, which is followed by a final group of workpiece features 316F42-316F46 that are measured at the end of the workpiece inspection program. Correspondingly, in the editable plan representation 334, the workpiece feature 336F6 is followed by the workpiece feature 336F9, which is followed by the workpiece feature 336F38, which is followed by the final group of workpiece features 336F42-336F46. For the illustrated state of the editable plan representations 314 and 334, the execution time indicator 372 is shown to indicate a total execution time of "0:23:36".

In contrast, as shown in FIG. 10, after the one or more sequence editing operations have been performed, the execution time indicator 372 is shown to indicate a reduced total execution time of "0:18:06". This corresponds to the inspection of the workpiece features being placed in a more efficient order, and may also correspond to a change in the CMM configuration, as will be described in more detail below. As shown in FIG. 10, the editable plan representation 314 and the editable plan representation 334 include the workpiece features that are to be inspected in the same order in which they were previously illustrated and described with respect to FIGS. 3-8. This order is correspondingly more efficient than the order illustrated in FIG. 9. A tracking area 339 at the bottom of the program view window 330 may also include data such as a number of probe changes as corresponding to the execution of the workpiece inspection program as executed by a current CMM configuration. In one implementation, the number of probe changes illustrated in the state of FIG. 9 is shown to be "26" while the number of probe changes in the state of FIG. 10 is reduced to "11", which may further contribute to the reduction in the total execution time as indicated by the execution time indicator 372.

In one implementation, the editing user interface portion 312 or 332 may include workpiece feature sequence editing features usable to alter an inspection sequence of the set of workpiece features to be inspected, as described above with respect to FIGS. 9 and 10. In such an implementation, the first set of operations may include a utilization of a workpiece feature sequence editing feature to alter the inspection sequence, and the execution time indicator 372 may automatically be updated in response to a utilization of the workpiece feature sequence editing feature. Different types of workpiece feature sequence editing features may be provided. For example, one type may include dragging a workpiece feature 316 or 336 to a new position in a displayed sequence of the editable set of workpiece features to be inspected. Another type may include cutting and pasting a workpiece feature 316 or 336 to a new position in a displayed sequence of the editable set of workpiece features to be inspected. Another type may include utilizing an execution time reducing command that automatically re-sequences the inspection sequence of the set of workpiece features to be inspected so as to reduce the execution time.

In one implementation, the user interface may include a CMM definition portion usable to define or revise the current CMM configuration. In such an implementation, the first set of operations may include a utilization of the CMM definition portion to revise the current CMM configuration, and the execution time indicator may automatically be updated in response to a utilization of the CMM definition portion to revise the current CMM configuration. The revised current CMM configuration may include at least one of: a revised configuration of at least one sensor; a revised model or type of CMM machine; or a revised motion control parameter used by the CMM control portion.

Figure 11:
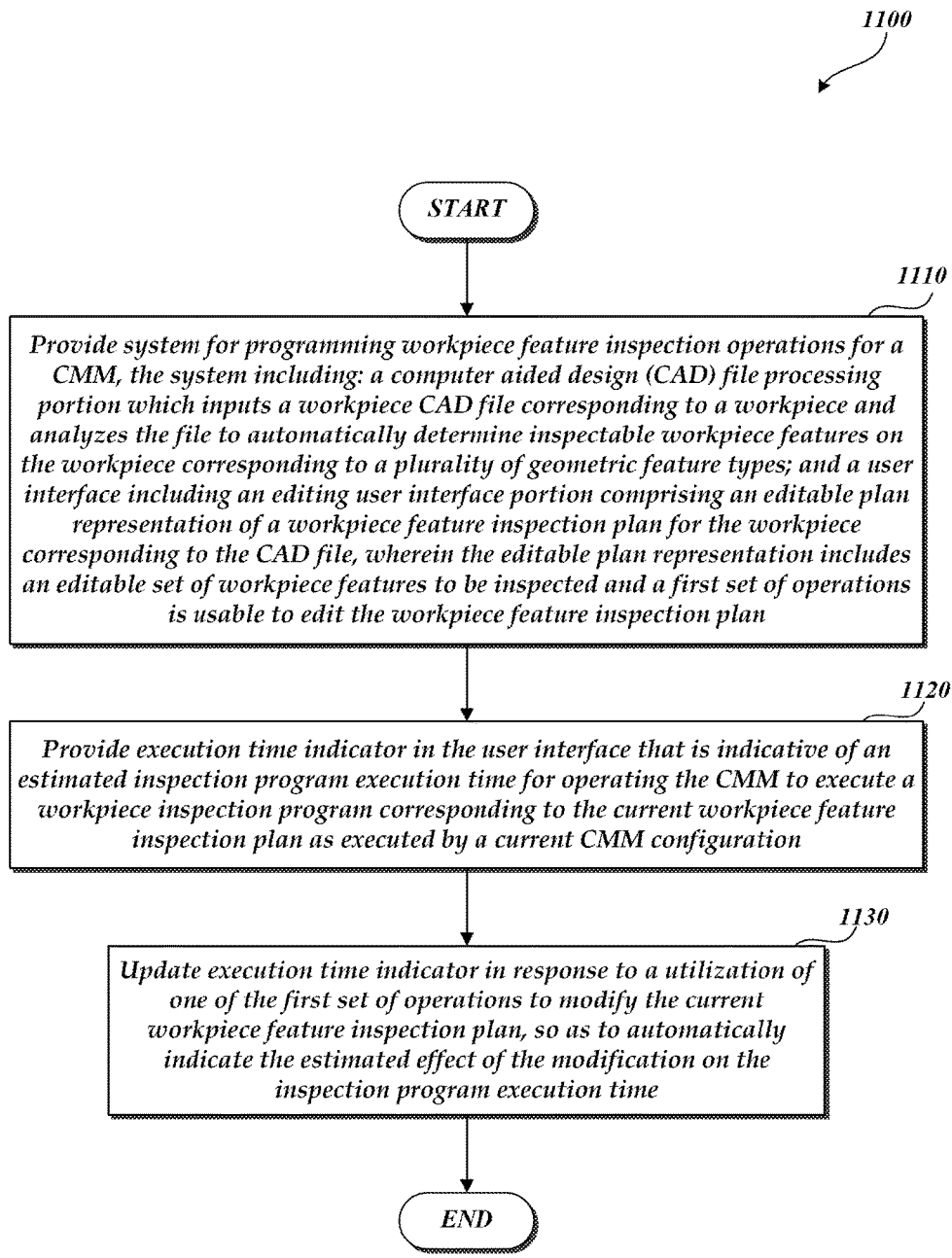
FIG. 11 is a flow diagram illustrating one exemplary implementation of a routine for operating a user interface of a system for programming workpiece feature inspection operations for a CMM.

FIG. 11 is a flow diagram illustrating one exemplary implementation of a routine 1100 for operating a user interface of a system for programming workpiece feature inspection operations for a CMM. At a block 1110, a system is provided for programming workpiece feature inspection operations for a CMM, the system including: a computer-aided design (CAD) file processing portion which inputs a workpiece CAD file corresponding to a workpiece and analyzes the file to automatically determine workpiece features on the workpiece corresponding to a plurality of geometric feature types; and a user interface including an editing user interface portion comprising an editable plan representation of a workpiece feature inspection plan for the workpiece corresponding to the CAD file, wherein the editable plan representation includes an editable set of workpiece features to be inspected and a first set of operations is usable to edit the workpiece feature inspection plan.

At a block 1120, an execution time indicator is provided in the user interface that is indicative of an estimated inspection program execution time for operating the CMM to execute a workpiece inspection program corresponding to the current workpiece feature inspection plan as executed by a current CMM configuration. At a block 1130, the execution time indicator is updated in response to a utilization of one of the first set of operations to modify the current workpiece feature inspection plan, so as to automatically indicate the estimated effect of the modification on the inspection program execution time.

While preferred implementations of the present disclosure have been illustrated and described, numerous variations in the illustrated and described arrangements of features and sequences of operations will be apparent to one skilled in the art based on this disclosure. Various alternative forms may be used to implement the principles disclosed herein. In addition, the various implementations described above can be combined to provide further implementations. All of the U.S. patents and U.S. patent applications referred to in this specification are incorporated herein by reference, in their entirety. Aspects of the implementations can be modified, if necessary to employ concepts of the various patents and applications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

The invention claimed is:

1. A system for programming workpiece feature inspection operations for a coordinate measuring machine, the coordinate measuring machine (CMM) including at least one sensor used for determining workpiece feature measurement data, a stage for holding a workpiece wherein at least one of the sensor or the stage are movable relative to one another, and a CMM control portion, the system comprising:
    a computer-aided design (CAD) file processing portion, which inputs a workpiece CAD file corresponding to the workpiece and analyzes the file to automatically determine inspectable workpiece features on the workpiece corresponding to a plurality of geometric feature types; and
    a user interface comprising:
        an editing user interface portion comprising an editable plan representation of a workpiece feature inspection plan for the workpiece corresponding to the CAD file, the editable plan representation comprising an editable set of workpiece features to be inspected; and
        an execution time indicator that is indicative of an estimated inspection program execution time for operating the CMM to execute a workpiece inspection program corresponding to the current workpiece feature inspection plan as executed by a current CMM configuration; and
    wherein a first set of operations is usable by an operator to manually modify the workpiece feature inspection plan and the system is configured such that the execution time indicator displayed to the operator on the user interface is automatically updated in real time in response to the operator's utilization of one of the first set of operations to modify the current workpiece feature inspection plan in the editing user interface portion, so as to automatically indicate an estimated effect of the modification on the inspection program execution time.

2. The system of claim 1, wherein:
    the editing user interface portion includes a workpiece feature exclusion element usable to exclude a workpiece feature from the set of workpiece features to be inspected;
    the first set of operations includes a utilization of the workpiece feature exclusion element to exclude a workpiece feature from the set of workpiece features to be inspected; and
    the execution time indicator is automatically updated in response to a utilization of the workpiece feature exclusion element.

3. The system of claim 2, wherein:
    the editing user interface portion includes a workpiece feature inclusion element usable to include a workpiece feature in the set of workpiece features to be inspected;
    the first set of operations includes a utilization of the workpiece feature inclusion element to include a workpiece feature in the set of workpiece features to be inspected; and
    the execution time indicator is automatically updated in response to a utilization of the workpiece feature inclusion element.

4. The system of claim 3, wherein the workpiece feature exclusion element and the workpiece feature inclusion element comprise the same element which operates to toggle between an exclusion state and an inclusion state for an associated workpiece feature.

5. The system of claim 1, wherein:
    the editing user interface portion includes a delete command usable to delete a currently selected workpiece feature from the set of workpiece features to be inspected;
    the first set of operations includes a utilization of the delete command; and
    the execution time indicator is automatically updated in response to a utilization of the delete command.

6. The system of claim 1, wherein:
    the editing user interface portion includes an undo command usable to undo a previously executed operation;
    the first set of operations includes a utilization of the undo command to undo a previously executed operation included in the first set of operations; and
    the execution time indicator is automatically updated in response to a utilization of the undo command.

7. The system of claim 1, wherein:
    the editing user interface portion includes workpiece feature sequence editing features usable to alter an inspection sequence of the set of workpiece features to be inspected;
    the first set of operations includes a utilization of a workpiece feature sequence editing feature to alter the inspection sequence; and
    the execution time indicator is automatically updated in response to a utilization of the workpiece feature sequence editing feature.

8. The system of claim 7, wherein the workpiece feature sequence editing feature that is utilized comprises one of:

dragging a workpiece feature to a new position in a displayed sequence of the editable set of workpiece features to be inspected;

cutting and pasting a workpiece feature to a new position in a displayed sequence of the editable set of workpiece features to be inspected; or utilizing an execution time reducing command that automatically re-sequences the inspection sequence of the set of workpiece features to be inspected so as to reduce the execution time.

9. The system of claim 1, wherein:

the user interface includes a CMM definition portion usable to define or revise the current CMM configuration;

the first set of operations includes a utilization of the CMM definition portion to revise the current CMM configuration; and the execution time indicator is automatically updated in response to a utilization of the CMM definition portion to revise the current CMM configuration.

10. The system of claim 9, wherein the revised current CMM configuration comprises at least one of:

a revised configuration of the at least one sensor;

a revised model or type of CMM machine; or a revised motion control parameter used by the CMM control portion.

11. The system of claim 1, wherein the user interface further comprises:

a workpiece inspection program simulation portion configurable to display a 3-D view including workpiece features on the workpiece and an indication of inspection operations to be performed on the workpiece features according to the current workpiece feature inspection plan; and a simulation status portion configured to characterize a state of progress through the current workpiece feature inspection plan corresponding to a currently displayed 3-D view, wherein the execution time indicator is included in the simulation status portion.

12. The system of claim 11, wherein the simulation status portion comprises a current time indicator that moves along a graphical total time range element to characterize a state of progress through the current workpiece feature inspection plan corresponding to the currently displayed 3-D view, and the execution time indicator is displayed in association with the graphical total time range element.

13. The system of claim 12, wherein the execution time indicator is displayed in the vicinity of the right-hand end of the graphical total time range element.

14. The system of claim 12, wherein the editing user interface portion further comprises:

a simulation status and control portion that includes the simulation status portion and a simulation animation control portion, the simulation animation control portion including elements that are usable to control at least one of a start, pause, stop or reset of an animated display of simulated progress through the current workpiece feature inspection plan as displayed in the 3-D view.

15. The system of claim 12, wherein the simulation status portion further comprises a current time display displayed in the vicinity of at least one of the current time indicator or the total time range element, the current time display comprising a numerical time representation that is automatically updated corresponding to the current time indicator or the currently displayed 3-D view, and that further characterizes the state of progress through the current workpiece feature inspection plan corresponding to the currently displayed 3-D view.

16. A method for operating a user interface of a system for programming workpiece feature inspection operations for a coordinate measuring machine so as to automatically indicate to a user of the system the estimated effect on a workpiece inspection program execution time in response to a utilization of one of a first set of operations to modify a current workpiece feature inspection plan corresponding to the workpiece inspection program, the method comprising:

providing a system for programming workpiece feature inspection operations for a coordinate measuring machine, the coordinate measuring machine (CMM) including at least one sensor used for determining workpiece feature measurement data, a stage for holding a workpiece wherein at least one of the sensor or the stage is movable relative to one another, and a CMM control portion, the system comprising:

a computer-aided design (CAD) file processing portion which inputs a workpiece CAD file corresponding to a workpiece and analyzes the file to automatically determine workpiece features on the workpiece corresponding to a plurality of geometric feature types; and a user interface comprising an editing user interface portion comprising an editable plan representation of a workpiece feature inspection plan for the workpiece corresponding to the CAD file, wherein the editable plan representation comprises an editable set of workpiece features to be inspected and a first set of operations is usable by an operator to manually edit the workpiece feature inspection plan;

providing in the user interface an execution time indicator that is indicative of an estimated inspection program execution time for operating the CMM to execute a workpiece inspection program corresponding to the current workpiece feature inspection plan as executed by a current CMM configuration; and automatically updating the execution time indicator, displayed to the operator on the user interface, in real time in response to the operator's utilization of one of the first set of operations to modify the current workpiece feature inspection plan in the editing user interface portion, so as to automatically indicate the estimated effect of the modification on the inspection program execution time.

17. The method of claim 16, wherein the first set of operations comprises one or more of:

a utilization of a workpiece feature exclusion element to exclude a workpiece feature from the set of workpiece features to be inspected, wherein the execution time indicator is automatically updated in response to a utilization of the workpiece feature exclusion element;

a utilization of a workpiece feature inclusion element to include a workpiece feature in the set of workpiece features to be inspected, wherein the execution time indicator is automatically updated in response to a utilization of the workpiece feature inclusion element;

a utilization of a delete command to delete a currently selected workpiece feature from the set of workpiece features to be inspected, wherein the execution time indicator is automatically updated in response to a utilization of the delete command;

a utilization of an undo command to undo a previously executed operation included in the first set of operations, wherein the execution time indicator is automatically updated in response to a utilization of the undo command;

a utilization of a workpiece feature sequence editing feature to alter the inspection sequence, wherein the execution time indicator is automatically updated in response to a utilization of the workpiece feature sequence editing feature; or a utilization of a CMM definition portion to revise the current CMM configuration, wherein the execution time indicator is automatically updated in response to a utilization of the CMM definition portion to revise the current CMM configuration.

18. The method of claim 16, wherein the editing user interface portion further comprises:

a workpiece inspection program simulation portion configurable to display a 3-D view including workpiece features on the workpiece and an indication of inspection operations to be performed on the workpiece features according to the current workpiece feature inspection plan; and a simulation status portion configured to characterize a state of progress through the current workpiece inspection plan corresponding to a currently displayed 3-D view, wherein the execution time indicator is included in the simulation status portion.

19. The method of claim 18, wherein the simulation status portion comprises a current time indicator that moves along a graphical total time range element to characterize a state of progress through the current workpiece feature inspection plan corresponding to the currently displayed 3-D view, and the execution time indicator is displayed in association with the graphical total time range element.

20. The method of claim 19, wherein the editing user interface portion further comprises:

a simulation status and control portion that includes the simulation status portion and a simulation animation control portion, the simulation animation control portion including elements that are usable to control at least one of a start, pause, stop or reset of an animated display of simulated progress through the current workpiece feature inspection plan as displayed in the 3-D view.

* * * * *